United States Patent
Dhua et al.

(10) Patent No.: US 10,176,198 B1
(45) Date of Patent: Jan. 8, 2019

(54) TECHNIQUES FOR IDENTIFYING VISUALLY SIMILAR CONTENT

(71) Applicant: A9.com, Inc., Palo Alto, CA (US)

(72) Inventors: Arnab Sanat Kumar Dhua, Mountain View, CA (US); Sunil Ramesh, San Jose, CA (US)

(73) Assignee: A9.COM, INC., Palo Alto, CA (US)

( * ) Notice: Subject to any disclaimer, the term of this patent is extended or adjusted under 35 U.S.C. 154(b) by 437 days.

(21) Appl. No.: 15/150,241

(22) Filed: May 9, 2016

(51) Int. Cl.
  *G06F 17/30* (2006.01)
  *G06K 9/62* (2006.01)

(52) U.S. Cl.
  CPC .. *G06F 17/30247* (2013.01); *G06F 17/30268* (2013.01); *G06K 9/627* (2013.01); *G06K 9/6215* (2013.01); *G06K 9/6227* (2013.01)

(58) Field of Classification Search
  CPC ........ G06F 17/30247; G06F 17/30268; G06K 9/6215; G06K 9/6227; G06K 9/627
  See application file for complete search history.

(56) References Cited

U.S. PATENT DOCUMENTS

| | | | | |
|---|---|---|---|---|
| 6,463,426 B1* | 10/2002 | Lipson | | G06F 17/30247 |
| 6,941,323 B1* | 9/2005 | Galperin | | G06F 17/30247 |
| 8,356,035 B1* | 1/2013 | Baluja | | G06F 17/30247 |
| | | | | 707/741 |
| 8,429,173 B1* | 4/2013 | Rosenberg | | G06F 17/30247 |
| | | | | 707/748 |
| 8,447,107 B1* | 5/2013 | Dhua | | G06K 9/4604 |
| | | | | 382/170 |
| 8,463,036 B1* | 6/2013 | Ramesh | | G06K 9/4642 |
| | | | | 382/170 |
| 8,781,231 B1* | 7/2014 | Kumar | | G06K 9/6224 |
| | | | | 382/159 |
| 8,787,679 B1* | 7/2014 | Ramesh | | G06K 9/4642 |
| | | | | 382/203 |
| 8,935,246 B2* | 1/2015 | Bengio | | G06F 17/30277 |
| | | | | 707/736 |
| 9,053,115 B1* | 6/2015 | Rosenberg | | G06F 17/30247 |
| 9,063,954 B2* | 6/2015 | Ioffe | | G06K 9/4676 |
| 9,299,009 B1* | 3/2016 | Arora | | G06F 3/0482 |
| 9,449,025 B1* | 9/2016 | Phung | | G06F 17/30256 |
| 9,558,213 B2* | 1/2017 | Ramesh | | G06F 17/30256 |
| 9,582,735 B2* | 2/2017 | Dube | | G06F 17/30247 |
| 9,691,161 B1* | 6/2017 | Yalniz | | G06K 9/6201 |
| 9,798,949 B1* | 10/2017 | Du | | G06K 9/46 |

* cited by examiner

Primary Examiner — Manav Seth
(74) Attorney, Agent, or Firm — Hogan Lovells US LLP

(57) ABSTRACT

Embodiments of the present invention provide techniques for identifying and recommending similar items based on visual similarity to a selected content item. Visual similarity may be characterized by identifying features depicted in a selected content item and comparing those features to features in an electronic catalog of content items. Visual similarity may also factor in medium and subject matter. For example, when a content item depicts a landscape painting, other landscape paintings (rather than paintings of different subject matter or photographs) will be recommended. Other visual characteristics, such as color theme and distribution, brushwork, etc. may also be represented in the recommended content items. As discussed further herein, different features may be weighted differently based on the analysis of the content item. These weightings enable the recommended content items to be tailored to visually similar subject matter.

20 Claims, 7 Drawing Sheets

TECHNIQUES FOR IDENTIFYING VISUALLY SIMILAR CONTENT

BACKGROUND

Users are increasingly utilizing computing devices to access various types of content. For example, users may utilize a search engine to locate information about various items. Conventional approaches to locating items involve utilizing a query to obtain results matching one or more terms of the query, navigating by page or category, or other such approaches that rely primarily on a word or category used to describe an item. Such approaches can make it difficult to locate items based on appearance or aesthetic criteria, such as a style or objects depicted. Approaches do exist to display related information such as recommendations along with the items to allow for locating an appropriate item. For example, if the user is viewing content for a specific item, the provider might cause content for one or more other items to be recommended to the user, where the recommendations are generated using information such as products that were viewed and/or interacted with previously by the user. For new users, or users who have not yet logged in or been identified, there will be no such information available on which to base recommendations. The recommendations will solely be based on information such as items in the same category or similar items, which will result in the use of resources to display content may not be related to what the user is searching for, resulting in a less than the optimal experience for the user.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to determining content to be provided for a user in an electronic environment. In particular, various embodiments analyze images from various sources to attempt to recognize features shown in an image that may be used to identify visually similar images that are associated with related items. This enables related items to be identified and recommended that otherwise may not have been readily identified from descriptive information available in an electronic catalog. In some cases, the images can include artwork, which may include abstract, representational, or figurative artwork items. For example, abstract artwork items may not depict specific objects, but may be characterized by their brushwork, patterns, colors, etc. Representational or figurative artwork items may depict specific objects, such as portraits, landscapes, buildings, vehicles, etc. Such content items therefore may represent highly diverse subject matter, and it may be difficult to textually describe the specific features of an item that a user may be looking for. Accordingly, embodiments of the present invention provide techniques for identifying and recommending similar items based on visual similarity to a selected content item. Visual similarity may be characterized by identifying features depicted in a selected content item and comparing those features to features in an electronic catalog of content items. Visual similarity may also factor in medium and subject matter. For example, when a content item depicts a landscape painting, other landscape paintings (rather than paintings of different subject matter or photographs) will be recommended. Other visual characteristics, such as color theme and distribution, brushwork, etc. may also be represented in the recommended content items. As discussed further herein, different features may be weighted differently based on the analysis of the content item. These weightings enable the recommended content items to be tailored to visually similar subject matter.

Various other functions and advantages are described and suggested below as may be provided in accordance with the various embodiments.

Figure 1:
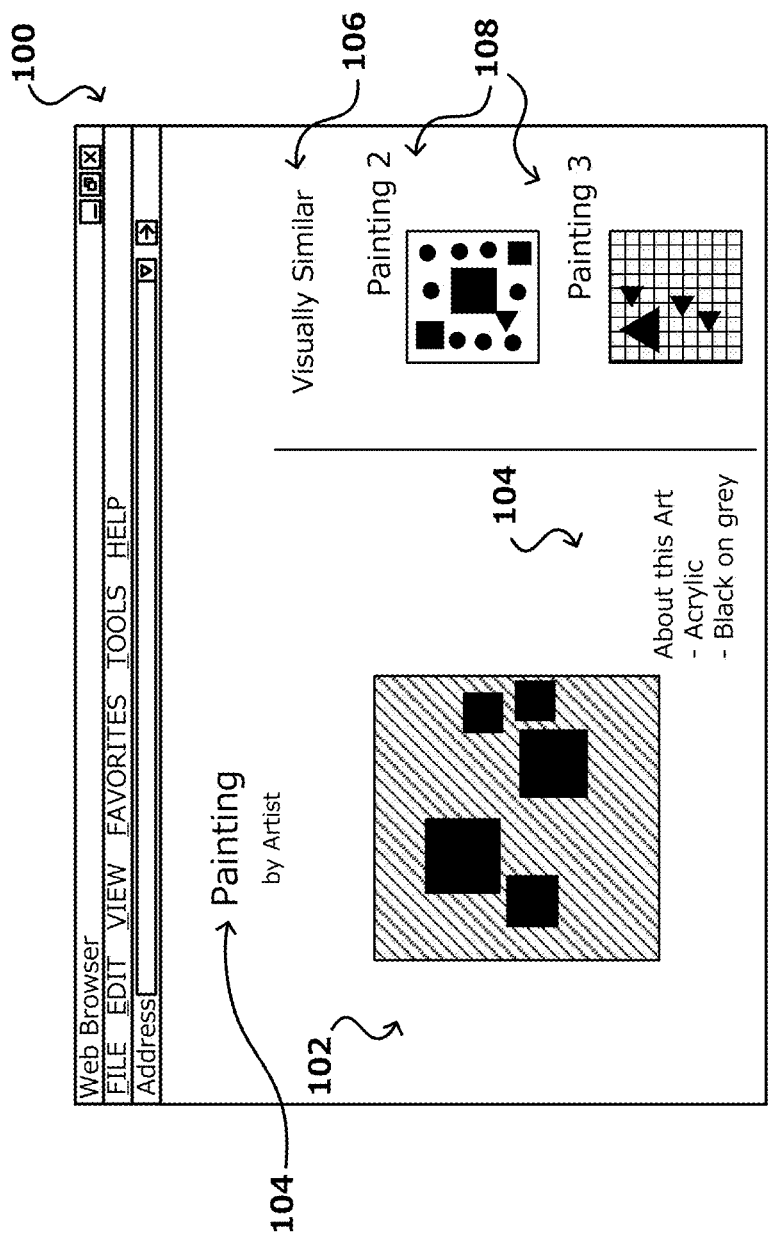
FIG. 1 illustrates an example display of content including visually similar recommendations, in accordance with various embodiments.

FIG. 1 illustrates an example display 100 of content that can be presented in accordance with various embodiments. In this example, a user of an electronic marketplace (or other such source of electronic content) has requested a page of content corresponding to an artwork (such as a painting, print, photograph, etc.) of interest to the user. The content can include, for example, an image 102 of the artwork, a description 104 of the artwork (e.g., title, author, type of work, medium, color scheme, etc.), and other such information or content. The page could have been accessed through a variety of different approaches, such as may be a result of a received search query, browse, or navigation request, among other such options. As illustrated, the display 100 also includes recommended items 106 displayed with the content. The recommended items might be provided with the content, or the code (e.g., HTML, XML, CSS, etc.) for displaying the content might include code causing one or more recommendations to be obtained from a third party and displayed with the content, according to any restrictions set by the content provider.

As shown in FIG. 1, the recommended content items 106 may be indicated as being visually similar and may be selected using various criteria. In this example, the objects 108 recommended are other paintings identified as being visually similar to the object of interest 102. For example, object of interest 102 includes a number of geometric shapes. When the image is analyzed, features of the images such as the size and distribution of the shapes, the type of shapes, etc. may be determined. These features can then be compared to a catalog of images which have been similarly analyzed and categorized. Visually similar images, e.g., those with similar features, groups of features, etc. may then be identified and displayed. For example, Painting 2 and Painting 3, shown at 108, also include geometric shapes.

Though the type and distribution of those shapes may vary, the visual style of the images is similar (for example, a landscape or portrait was not recommended). While a Web browser interface is shown as an example in FIG. 1, it should be understood that other types of interfaces or displays of content can be presented as well, such as an interface displayed as part of a mobile app displayed on a portable computing device.

Content items can be served, or otherwise received from, the same or different providers over the same or different networks. In determining which recommendations to provide, it can be desirable in at least some embodiments to determine content that is likely to be viewed and/or objects that are likely to be consumed by a user based at least in part upon information known for the user. For example, in the situation where a user is browsing an electronic marketplace, content that is likely to be viewed and/or objects that are likely to be consumed can include information about items or content that the user has viewed, searched, or consumed, among other such options. This can be combined with various other types of information in order to generate not only recommendations that are related to the content being viewed, but are also relevant to the user based upon what is known about the particular user. There are many algorithms and approaches used for processing such content to determine recommendations or suggestions to be displayed to a user.

Accordingly, approaches in accordance with various embodiments attempt to determine information that can help to produce more useful recommendations to be displayed for content items where desired features may not be readily or uniformly described textually. In various embodiments, image data associated with a content item can be analyzed and aggregated in order to attempt to locate other content items that are related and relevant to the content item, at least as it relates to visual similarities. For example, a set, stream, or other collection of image data (i.e., still images or video) can be analyzed to train classifiers that can be used to identify features represented in the image data. Additionally, analysis of the image data can include identifying local feature descriptors and generating histograms of visual words that describe the image data. A query image can be analyzed to attempt to determine features of the query image. These features may then be compared to the features of the image data to identify visually similar images. The similarity of different types of features may be weighted differently to provide visually similar images that are similar across a variety of different visual characteristics, such as color theme and distribution, brushwork, etc.

Figure 2:
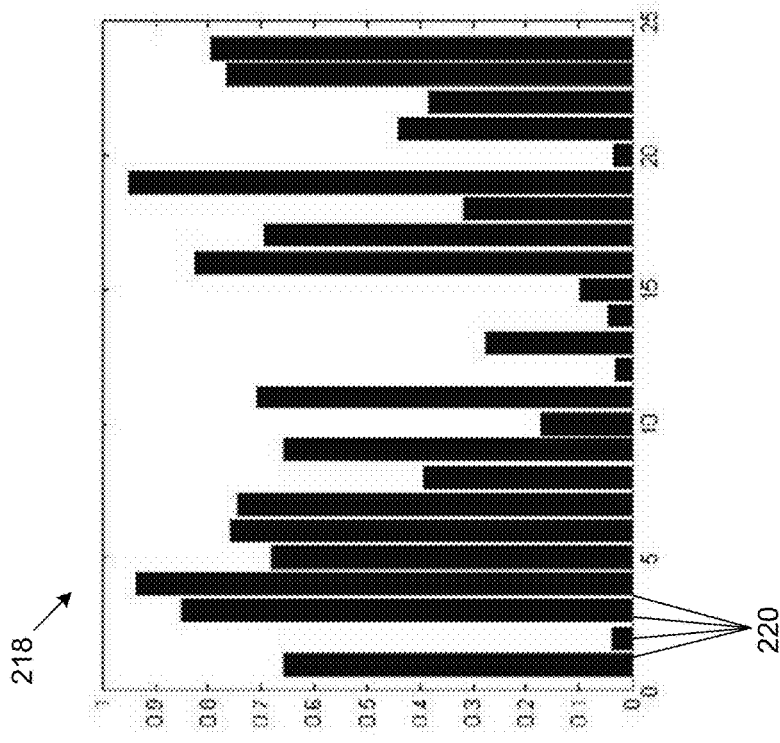
FIG. 2 illustrates an example of computing local features for an image, in accordance with various embodiments.
Figure 2:
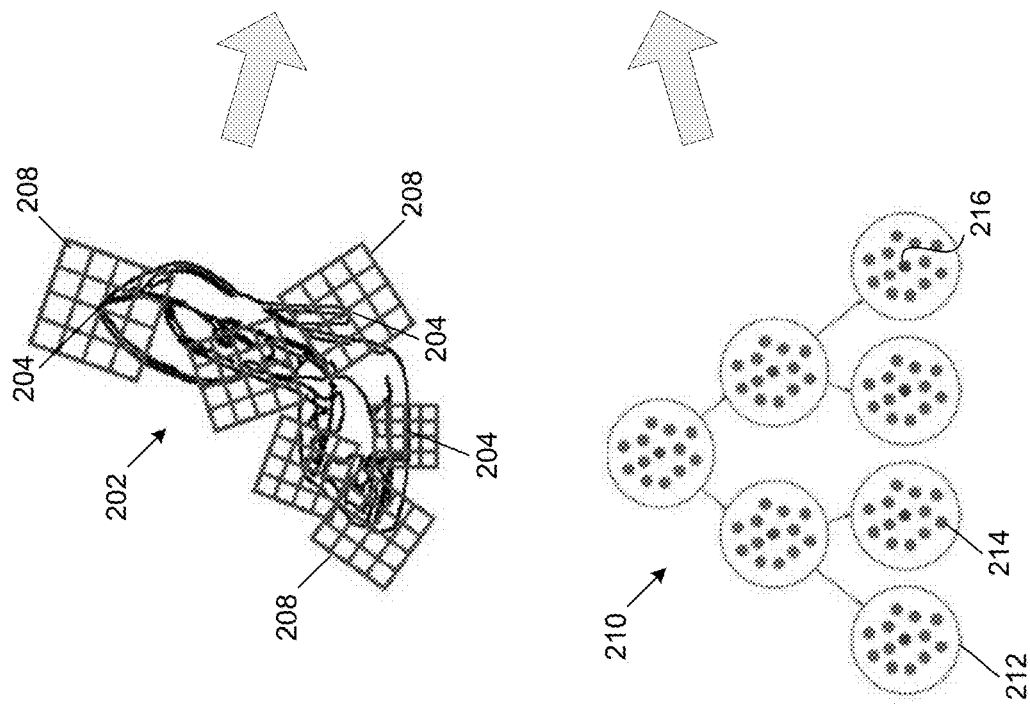

FIG. 2 illustrates 200 an example of computing local features for an image, in accordance with various embodiments. Embodiments of the present invention can identify visually similar content items to a selected or queried content item using engineered computer vision techniques to identify features of the content item, as well as machine learning techniques to identify features of the content item such as depicted objects. FIG. 2 shows one example of identifying local features of a content item using computer vision techniques.

As shown in FIG. 2, a content item can be analyzed to determine various local features of the content item. A collection of images can be similarly analyzed to create a vocabulary of features, the vocabulary may be hierarchical or non-hierarchical. By comparing the local features to the vocabulary, a histogram of local feature descriptors for the content item can be generated. Visually similar content items may then be identified using the histograms (e.g., content items with similar histograms). As shown in FIG. 2, a content item, such as an image 202, can be analyzed to determine one or more feature points 204. For example, in FIG. 2, an image of a shoe is analyzed. In accordance with an embodiment, feature points are specific points in an image which are robust to changes in image rotation, scale, viewpoint or lighting conditions. Feature points are sometimes referred to as points of interest. For example, to identify feature points of an image, the image may be smoothed and down-sampled into image pyramids, each of which contain several pyramid images. Feature points may then be identified in the pyramid images by finding the Harris corner measure at different points in the pyramid images. For example, the local maxima in the Harris corner measure may be identified as feature points. According to some embodiments, these identified feature points are invariant to certain transformations of the images, like zooming, scaling and rotation of the image.

After the feature points of the images are identified, feature vectors for the feature points are calculated. According to the embodiment illustrated in FIG. 2, to calculate feature vectors of image 202, the orientations of the feature points 204 of the image 202 are determined. For example, a set of orientation calculating algorithms may use the gradient of the image 202 to determine the orientations of the feature points 204. Then, according to the illustrated embodiment, patches 208 are extracted around each of the feature points 204. The patches 208 are then converted to feature vectors using standard techniques. The feature vectors of image 202 are represented at 210 in FIG. 2. Examples of suitable feature vectors include scale-invariant feature vectors such as the "SIFT keys" described in David G. Lowe, "Object Recognition from Local Scale-Invariant Features," Proceedings of the International Conference on Computer Vision, September, 1999.

In various embodiments, feature vectors may be determined for a plurality of images in an electronic catalog. The feature vectors for the plurality of images may be sorted into clusters, and an index tree of clusters can be created. In some embodiments, the feature vectors may be clustered and sorted by utilizing a conventional hierarchical k-means clustering technique, such as that described in Nister et al., "Scalable Recognition with a Vocabulary Tree," Proceedings of the Institute of Electrical and Electronics Engineers (IEEE) Conference on Computer Vision and Pattern Recognition (CVPR), 2006. As shown in FIG. 2, nodes or clusters 212 may each have feature vectors 214 clustered therein. Although FIG. 2 shows the clusters arranged hierarchically, non-hierarchical clusters may also be used. Additionally, more or fewer clusters may be created depending on the types and variety of the images being analyzed.

In some embodiments, a cluster descriptor is determined for each of the clusters. Like feature vectors, cluster descriptors may be viewed as vectors in a vector space. Furthermore, cluster descriptors may be based at least in part on the feature vectors of the clusters they characterize. For example, a cluster descriptor may be calculated for a cluster, where the cluster descriptor corresponds to a point in the descriptor space that is a mean and/or a center (e.g., a geometric center) of the feature vectors in the cluster. FIG. 2 illustrates a cluster descriptor for one cluster at 216. As indicated above, the cluster descriptor 216 of a particular cluster can correspond to the mean and/or center of the feature vectors that are grouped in the cluster.

In an addition to providing a cluster descriptor for each cluster, a visual word is provided for each cluster. According to some embodiments, the visual words are labels that represent the clusters, but—unlike the cluster descriptors—the visual words do not include location information for the clusters. Accordingly, by excluding location information from the visual words, the visual words may be categorized, searched, or otherwise manipulated relatively quickly.

A local-feature histogram 218 can be created for the images of the collection of images. According to an embodiment, each local-feature histogram is created with a number of bins 220 that correspond to the number of clusters created. Because each cluster is associated with a visual word, the number of bins also corresponds to the number of visual words. Each bin of a particular local-feature histogram is populated with data that indicates the number of the feature vectors of the image that were mapped to the cluster that corresponds to the bin. Accordingly, because each cluster is represented by a visual word, the data included in a bin of a local-feature histogram of an image indicates the number of feature vectors associated with each visual word.

In some embodiments, when a query image is received, e.g., when the user selects a detail view of a content item (such as is shown in FIG. 1, where the query image is image 102), the query image can be analyzed to determine its local features, as described above. A histogram can then be generated for the query image. Visually similar images can then be identified that have similar histograms.

Figure 3A:
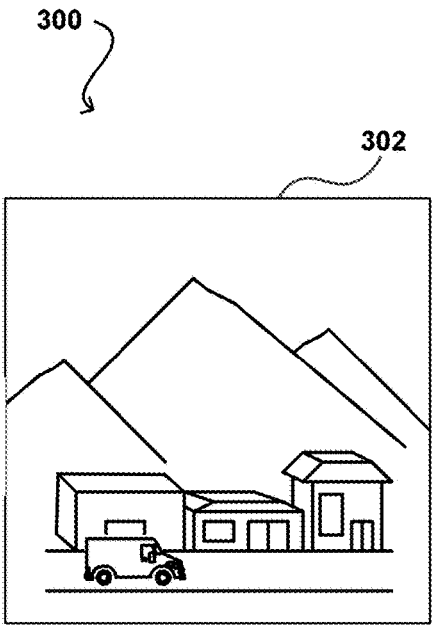
FIGS. 3A, 3B, and 3C illustrate examples of content items, in accordance with various embodiments.
Figure 3B:
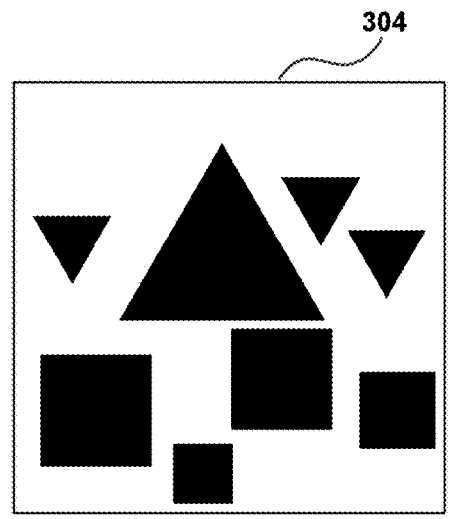
Figure 3C:
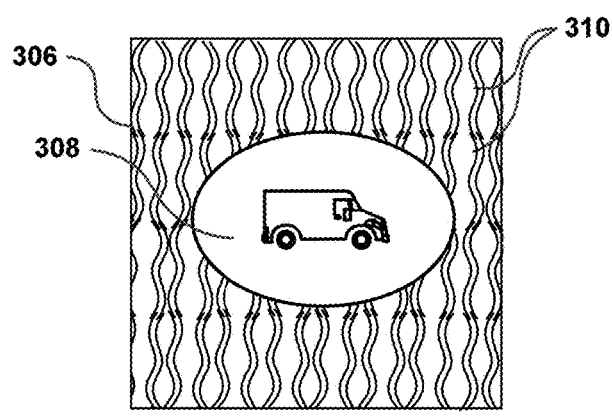

FIGS. 3A, 3B, and 3C illustrate examples 300 of content items, in accordance with various embodiments. As shown in FIG. 3, different content items may share local features identified using techniques described above, without being visually similar. For example, content item 302, shown in FIG. 3A, depicts a mountain town, with a mountain landscape in the background and a town scene in the foreground. When analyzed, content item 302 may result in a histogram that indicates triangular shapes and box shapes, which may result in a match to content item 304. As shown in FIG. 3B, content item 304 is an abstract artwork item that includes a number of colored shapes. Although there are visual similarities, the subject matter, style, and other visual factors are very different to content item 302. In accordance with various embodiments, determining visually similar items based on subject matter and/or depicted objects in the content item can be determined using a classifier trained to identify objects (e.g., people, faces, cars, boats, airplanes, buildings, fruits, vases, birds, animals, furniture, clothing etc.) represented in an image to generate an object feature descriptor that can be used to compare against a data store of object feature descriptors to locate related content items. Classifiers may also be trained to identify subjects which may include one or more objects that define a particular type of scene. For example, subjects may include landscapes, cityscapes, portraits, night skies, or other subject matter The classifier can be trained using a convolutional neural network (CNN). As discussed above, feature descriptors may be identified using both computer vision techniques and using CNN classifiers. For simplicity of description, the feature descriptors obtained using computer vision techniques may be referred to as local feature descriptors and the feature descriptors obtained using the classifiers may be referred to as object feature descriptors.

Convolutional neural networks are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. There is an input layer which along with a set of adjacent layers forms the convolution portion of the network. The bottom layer of the convolution layer along with a lower layer and an output layer make up the fully connected portion of the network. From the input layer, a number of output values can be determined from the output layer, which can include several items determined to be related to an input item, among other such options. CNN is trained on a similar data set (which includes people, faces, cars, boats, airplanes, buildings, landscapes, fruits, vases, birds, animals, furniture, clothing etc.), so it learns the best feature representation of a desired object represented for this type of image. The trained CNN is used as a feature extractor: input image is passed through the network and intermediate outputs of layers can be used as feature descriptors of the input image. Similarity scores can be calculated based on the distance between the one or more feature descriptors and the one or more candidate content feature descriptors and used for building a relation graph.

A content provider can thus analyze a set of images and determine items that may be able to be associated in some way, such as paintings of similar subjects, in a similar style, or other visual features. New images can be received and analyzed over time, with images having a decay factor or other mechanism applied to reduce weighting over time, such that newer trends and fashions are represented by the relations in the classifier. A classifier can then be generated using these relationships, whereby for any item of interest the classifier can be consulted to determine items that are related to that item visually.

In order to determine the items that are relevant to the item of interest, it can be desirable in at least some embodiments, to generate a robust color representation of the content item. For example, as described, a robust color representation is desirable in at least some embodiments, to identify relevant colors and the distribution of colors represented in images. A CNN can be used to learn a color descriptor corresponding to, e.g., a dominant color in the content item, a color distribution in the content item, etc., which may then be used to identify relevant content as described further herein.

In some embodiments, a content item may include multiple subjects. For example, as shown in FIG. 3C, content item 306 includes a portrait of a truck 308 on a patterned background 310. In some embodiments, such a content item might be segmented, to isolate the different subjects. For example, the background pattern 310 may be removed, making the truck 308 the object of interest. The portion of the content item corresponding to the truck may then be analyzed as described above. In this example, other images of trucks may then be identified. Additionally, or alternatively, truck 308 may be removed and the portions of the content item corresponding to the background pattern 310 may be analyzed, generating recommendations that have a similar pattern style, but possibly paired with a different subject. For example, a similar background pattern may be used to frame a portrait of a person, a house, a landscape, etc. In other embodiments, an automatic segmentation process can be used to analyze the various images and attempt to segment the image into portions corresponding to a single person or entity, individual objects or items in the image, or other such segments. In some embodiments, if a content item includes multiple objects, other content items that include the same or similar combination of objects may be identified and recommended. In some embodiments, a portion of the image may be selected, by a user or other entity, for further analysis and recommendation. In some embodiments, portions of the image may be sampled to automatically identify different portions of an image that include related regions (e.g., particular objects, patterns, or other features).

Various approaches may be used to determine a region corresponding to one subject versus a region corresponding to a different subject. For example, an attempt can be made to locate and/or grow connected regions of background color/pattern/imagery from the corners or sides of the image towards the center of the image, to the extent possible. A connected component analysis, for example, can be utilized to attempt to connect the entire background region of the image, with the remaining region(s) being considered potential objects(s) of interest. In example content item 306 of FIG. 3C, the content item can be sampled starting in the corners and move inward. The sampling may continue as the same pattern is identified. The pattern is broken at the truck portrait 308, which may be identified in the sampling. The pattern region may then be separated from the truck region.

Embodiments of the present invention can use the penultimate layer of the CNN as the feature vector. As discussed above, the CNN can be trained for object recognition, that is, this network is trained to recognize specific objects, types of scenes, or similar subject matter. Examples of objects that this network is trained to recognize may include people, faces, cars, boats, airplanes, buildings, fruits, vases, birds, animals, furniture, clothing etc. As discussed herein, a subject may include one or more objects which define a particular type of scene. For example, subjects may include landscapes, cityscapes, portraits, night skies, or other subject matter The object feature vector may indicate the object affinity of a given image (e.g., how similar an object depicted in an image is to a trained object). However, the results from the CNN alone can result in images of different media (e.g., a photograph of a landscape) to show up as related to a query image (e.g., a painting of a landscape). As such, neither the classifier-based object recognition nor the local feature analysis alone provides a set of recommendations that with adequate visual similarity. As such, a combination of the classifier-based object recognition and the local feature analysis can be used to identify related content items, as described further below.

Embodiments of the present invention can use a classification score generated by the classification layer of the CNN to generate a local feature weight and an object recognition weight. The classification score generated by the CNN indicates how close the subject of the query image is to an object the CNN has been trained to identify. As such, high scores correspond to a high likelihood that the subject of the query image is one or more specific objects, whereas low scores indicate that the subject of the query image is likely not an object or is an object that the CNN has not been trained to identify. Using this score, the results of the local feature analysis and the object recognition analysis can be weighted.

Figure 4:
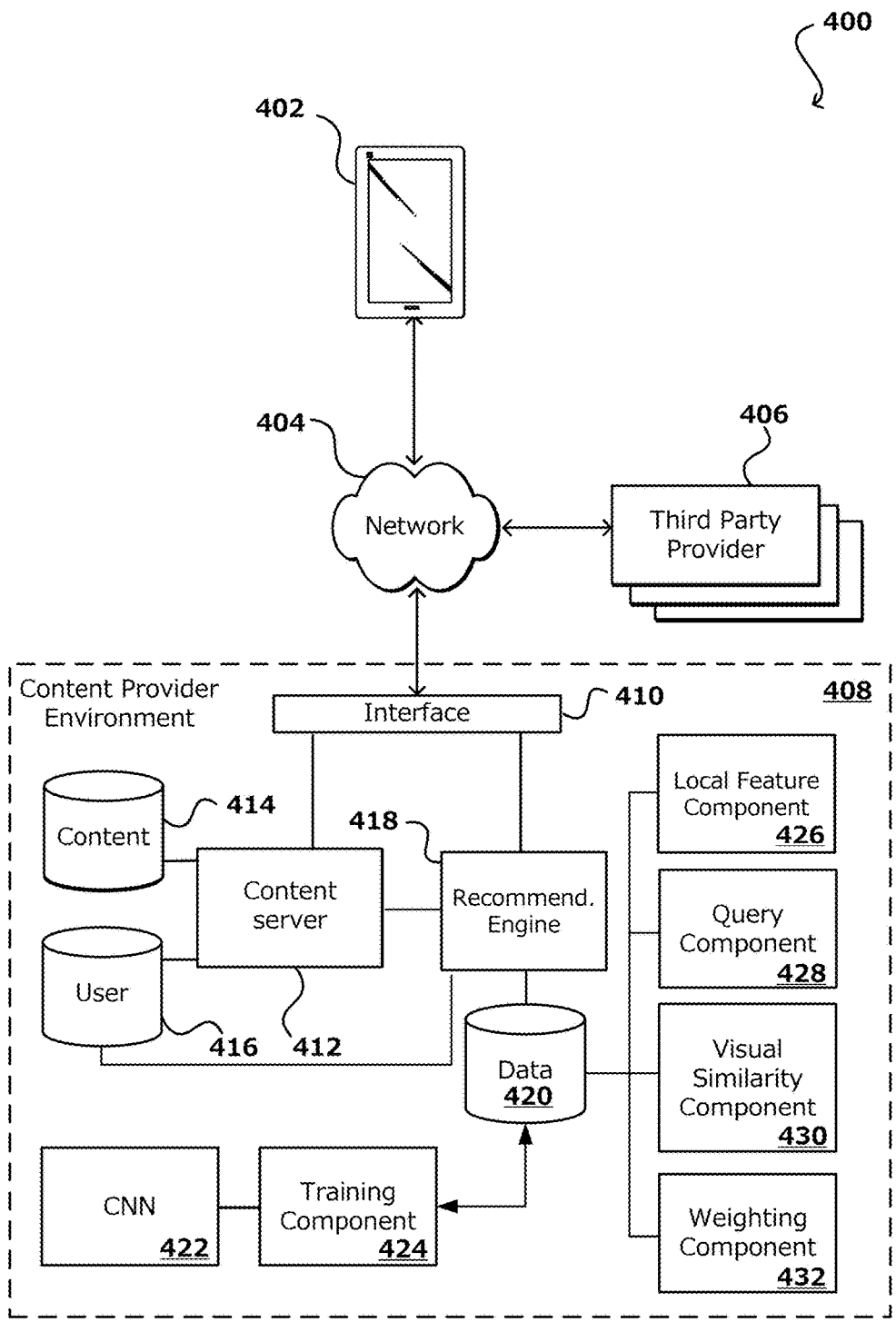
FIG. 4 illustrates an example environment for determining visually similar items that can be utilized in accordance with various embodiments.

FIG. 4 illustrates an example environment 400 for determining visually similar items that can be utilized in accordance with various embodiments. In order to determine visually similar content items, in at least some embodiments, some analysis of content items in an electronic catalog or other data repository is performed to determine information about the visual characteristics of the items. In some embodiments, one or more feature descriptors can be generated to describe features of an image (such as, color, content, brushwork, style, etc.).

In the example shown in FIG. 4, a convolutional neural network (CNN) 422 can be trained using images of objects that include metadata. For example, the CNN 422 may be trained to perform object recognition using images of people, faces, cars, boats, airplanes, buildings, fruits, vases, birds, animals, furniture, clothing etc. CNN 422 can also be trained to identify the subject matter depicted in a given image, such as landscapes, portraits, night skies, cityscapes, etc. In certain embodiments, training a CNN may involve significant use of computation resources and time, such that this may correspond to a preparatory step to servicing search requests and/or performed relatively infrequently with respect to search request servicing and/or according to a schedule. An example process for training a CNN for generating descriptors describing visual features of an image in a collection of images begins with building a set of training images. In accordance with various embodiments, each image in the set of training images can be associated with an object label describing an object depicted in the image or a subject represented in the image. According to some embodiments, training images and respective training object labels can be located in a data store 420 that includes images of a number of different objects, wherein each image can include metadata. The metadata can include, for example, the title and description associated with the objects. The metadata can be used to generate object labels that can be used to label one or more objects or subjects represented in the image. In some embodiments, the training images may include real world images (e.g., photographs of actual objects) and/or may include artwork images (e.g., artistic depictions of objects).

A training component 424 can utilize the training data set (i.e., the images and associated labels) to train CNN 422. In accordance with various embodiments, a CNN can be used to determine one or more objects and/or a subject represented in an image. As discussed herein, the subject may include landscapes, cityscapes, night skies, or other subject matter of the image. In some embodiments, the subject may include depictions of one or more objects, such as people, faces, cars, boats, airplanes, buildings, fruits, vases, birds, animals, furniture, clothing etc. As further described, CNNs include several learning layers in their architecture. A query image from the training data set is analyzed using the CNN to extract a feature vector from the network before the classification layer. This feature vector describes the subject and/or objects shown in the image. This process can be implemented for each of the images in the data set, and the resulting object feature vectors can be stored in a data store.

In various embodiments, the resulting object feature vectors can be compressed for improved processing. For example, the object feature vectors generated by the CNN may include object feature vectors that have a large number of dimensions. The dimensions of these object feature vectors can be reduced by applying at least one of Principal Component Analysis (PCA) or Multi-Dimensional Scaling (MDS). Advantageously, such an approach can reduce storage demands and significantly improve latency performance. Additionally, such an approach can remove or at least reduce noise in the transformed space since the tailing dimensions generally correspond to noise and discarding them helps to focus on the useful signal when measuring similarities.

Additionally, as discussed above with respect to FIG. 2, the set of training images, or other collection of images maintained by content provider environment 408, may also be used to generate a set of local feature descriptors using computer vision techniques. Local Feature component 426, or other such component, can cluster the local feature descriptors and associate cluster with a visual word. Local Feature component 426 can create a local-feature histogram for each of the images, with each histogram including a number of bins that correspond to the number of clusters, with each cluster associated with a visual word. Each bin of a particular local-feature histogram is populated with data that indicates the number of the feature vectors of the image that were mapped to the cluster that corresponds to the bin. Accordingly, because each cluster is represented by a visual word, the data included in a bin of a local-feature histogram of an image indicates the number of feature vectors associated with each visual word.

A query image may be received from client device 402 over network 404 and processed by query component 428. In some embodiments, the query image can be received when a selection of an image from a third party provider 406 or content provider environment 408 is selected, e.g., through the selection of a content item. When a query image is received, for example, a set of query object descriptors may be obtained or determined for the query image. For example, if the query image is not part of an electronic catalog and does not already have associated feature descriptors, the system may generate feature descriptors (both local feature descriptors and object feature descriptors) for the query content in a same and/or similar manner that the feature descriptors are generated for the collection of images, as described. Also, for example, if the query image is part of the collection then the feature descriptors for the query image may be obtained from the appropriate data store. Additionally, the query image can be analyzed to determine local feature descriptors for the query image. Using the clustered feature vectors and corresponding visual words determined for the training images, a histogram for the query image can be determined. The query image can also be analyzed using the CNN 422 to extract a feature vector from the network before the classification layer. This feature vector describes the subject and/or objects shown in the image. Using the local feature descriptors and object feature descriptors, visually similar images in content provider environment 408 can be identified.

A visual similarity component 430 or other such component can be used to search the collection of images to identify a set of images that are visually similar to the query image. Since feature descriptors have been calculated or obtained for the query image both through classifier-based object recognition (e.g., object feature descriptors using CNN 422) and local feature analysis (e.g., local feature descriptors), comparing images can be accomplished by comparing the feature descriptors of query images to the feature descriptors of the images of the collection. According to some embodiments, dot product comparisons are performed between the feature descriptors of the query image and the corresponding feature descriptors of the images of the collection. The dot product comparisons are then normalized into similarity scores. Thus, between any two images, at least two similarity scores are provided: (1) a similarity score between the local-feature descriptors of the images; and (2) a similarity score between the object feature descriptors of the images. In some embodiments, a color feature descriptor may also be determine for each image and a similarity score between the color feature descriptors of the images can be calculated. After similarity scores are calculated between the different types of feature descriptors of the images, the similarity scores can be combined. For example, the similarly scores may be combined by a linear combination or by a tree-based comparison that learns the combinations. For example, using a linear combination may provide the advantage of enabling a user to assign different weights to the different types of feature descriptors, thereby causing the search module to consider the weighting when selecting the nearest visually similar content items. It should be appreciated that instead of a dot product comparison, any distance metric could be used to determine distance between the different types of feature descriptors, such as determining the Euclidian distance between the feature descriptors.

In some embodiments, weighting component 432 can calculate weights for the different types of similarity scores. For example, a weight for each dimension (color, local feature descriptors, object feature descriptors, etc.) may range between 0 and 1. A weight of zero would eliminate that dimension from being used to identify visually similar content items and a weight of one would maximize the influence of that dimension. However, as described above, neither dimension alone adequately identifies visually similar items. Accordingly, a minimum weight may be defined for each dimension. In some embodiments, the minimum weight may be determined heuristically by analyzing recommended visually similar items, user feedback, or other feedback sources. Accordingly, the weighting component 432 can determine the weights based on the following:

Minimum base weight for local feature descriptors=$W_{min}^l$

Minimum base weight for object feature descriptors=$W_{min}^d$

Confidence score of the CNN classifier=$C_{max}$, $0 \leq C_{max} \leq 1$

Weight for local feature descriptors: $W^l = W_{min}^l + (1 - W_{min}^l) \times (1 - C_{max})$ Weight for object feature descriptors: $W^d = W_{min}^d + (1 - W_{min}^d) \times C_{max}$ As shown above, when the CNN classifier calculates a high confidence score (indicating a high likelihood of a specific object or subject being depicted in the query image), the weight for the object feature descriptors will approach 1 (e.g., the maximum weight) while the weight for the local feature descriptors will approach (e.g., $W_{min}^l$ the minimum weight).

After the combined similarity scores are determined, a set of nearest feature descriptors may be selected. For example, the search module may select a subset of feature descriptors associated with images of the collection that are nearest the query feature descriptors as determined by the combined similarity scores. Images in the collection associated with the subset of nearest feature descriptors may be provided for analysis and/or presentation. For example, the search module may determine images in the collection that match the set of nearest content feature descriptors and provide at least reference to the matching images. As mentioned, in various embodiments the references can be used with a recommendations component 418 to generate recommendations for a user based on information known or obtainable with respect to the items for the matching images.

In some embodiments, the confidence score can be used to determine whether to filter results and/or present one or more filter options to a user. If the confidence score indicates a high object affinity (e.g., a high likelihood that a particular object is depicted in the image) then the matching images can be filtered using the corresponding object. For example, as described above the confidence score may be normalized between 0 and 1. If an image is analyzed and it is determined that the image depicts a representation of a cup with a confidence score above a threshold (e.g., greater than 0.9), then a filter may be applied related to images that also include cups. For example, the filter may exclude any images that do not include cup metadata (e.g., a descriptor indicating that the image includes a representation of a cup). Additionally, or alternatively, the filter may cause the results to be sorted to show images that include representations of cups at a higher position than images that show representations of mugs or other cup-like objects. In some embodiments, the filter can be applied to the set of visually similar images. In some embodiments, the filter can be applied to a category of content items being viewed by a user. For example, if a user if browsing artwork, then all artwork images may be filtered based on the recognized object. Such filers may be applied automatically or may be presented as selectable options to the user. For example, a selectable icon may be displayed which indicates that will cause a set of images to be filtered based on a corresponding object. In some embodiments, different threshold values may be associated with different filtering actions. For example, a very high confidence score (such as a score that is greater than 0.95) may cause the results to be automatically filtered, whereas a lower confidence score, such as 0.75 or 0.8, may cause the filter option to be displayed to the user.

In some embodiments, the weight values determined above based on the confidence score can be modified by a user. For example, a user interface can be displayed that provides one or more selectable objects (such as sliders, text boxes, or other visual elements) with which the user may interact to change the weightings. In some embodiments, default weightings can be applied based on a user profile. For example, a user can define default weightings for different types of content items or default weightings may be set automatically based on user search history or history of weighting adjustments.

In a post processing aspect of the environment, a user is able to use a client device 402 to submit a request for content, such as a webpage or page of an electronic book, across at least one network 404. Although a portable computing device (e.g., an electronic book reader, smart phone, or tablet computer) is shown as the client device, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, wearable computers (i.e., smart watches and glasses) and portable media players, among others.

The at least one network 404 can include any appropriate network, such as may include the Internet, an Intranet, a local area network (LAN), a cellular network, a Wi-Fi network, and the like. The request can be sent to an appropriate content provider environment 408, which can provide one or more services, systems, or applications for processing such requests. The content provider can be any source of digital or electronic content, as may include a website provider, an online retailer, a video or audio content distributor, an e-book publisher, and the like.

In this example, the request is received to a network interface layer 410 of the content provider environment 408. The network interface layer can include any appropriate components known or used to receive requests from across a network, such as may include one or more application programming interfaces (APIs) or other such interfaces for receiving such requests. The network interface layer 410 might be owned and operated by the provider, or leveraged by the provider as part of a shared resource or "cloud" offering. The network interface layer can receive and analyze the request from the client device 402, and cause at least a portion of the information in the request to be directed to an appropriate system or service, such as a content server 412 (e.g., a Web server or application server), among other such options. In the case of webpages, for example, at least one server 412 might be used to generate code and send content for rendering the requested Web page. In cases where processing is to be performed, such as to generate search results, perform an operation on a user input, verify information for the request, etc., information might also be directed to at least other server for processing. The servers or other components of the environment might access one or more data stores, such as a user data store 416 that contains information about the various users, and one or more content repositories 414 storing content able to be served to those users.

As mentioned, in at least some embodiments the content to be provided can include data 420 for one or more recommendations, or other such elements that are selected based on information for the user associated with the request, for example by providing information to a recommendation engine 418 or other such component or service, for analyzing the provided information and attempting to generate recommendations or other elements as discussed herein. In some embodiments, this can utilize content generated within the content provider environment 408 or received from one or more third party providers 406, among other such options. For example, a collection of images can be generated using images captured within the environment or received from the third party providers 406.

Figure 5:
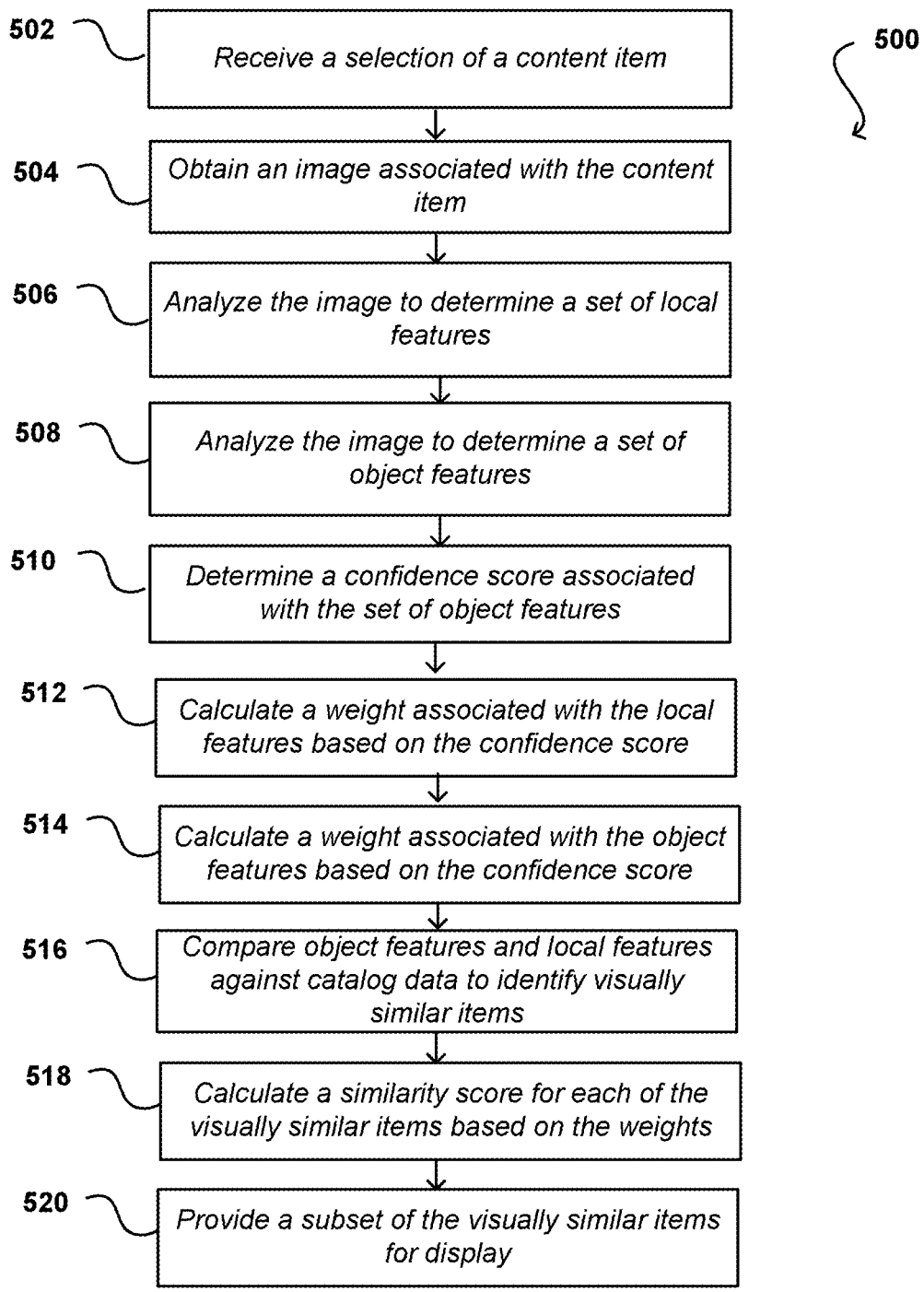
FIG. 5 illustrates an example process for determining visually similar content that can be utilized in accordance with various embodiments.

FIG. 5 illustrates an example process 500 for determining visually similar content that can be utilized in accordance with various embodiments. As shown in FIG. 5, a selection of a content item can be received 502. As discussed, the selection of the content item can be received from a user device by, e.g., requesting a particular content item, requesting a web page associate with the content item, etc. In some embodiments, the selection of the content item can be received from or through a third party content provider or broker. An image associated with the content item can then be received 504, the image can include a representation of a subject. For example, the image may be shown on a web page associated with the content item or may otherwise by associated with the content item. In some embodiments, the image may be a representation of an artwork item, the subject of the artwork item including one or more of abstract art, representational art, or figurative art features.

In accordance with an embodiment, the image can be analyzed 506 to determine one or more local features of the image. As discussed above, computer vision techniques can be used to identify local feature points, and from those points local feature descriptors which can be clustered and associated with visual words to describe the features of the image. A histogram may represent the local features identified in a given image. Additionally, the image can be analyzed 508 to determine one or more object features of the image. As discussed above, the image may be analyzed using a CNN to identify object feature descriptors for any objects or subjects which the CNN has been trained to identify that are shown in the image. The object feature descriptors can indicate an object affinity for the image (e.g., how similar an object depicted in the image is to an object which the CNN has been trained to identify). This way, an image of a tall glass may have a closer object affinity to a "cup" object than to a person or a car object. The CNN can also determine 510 a confidence score based on the object affinity represented by the one or more object features.

Using the confidence score, a first weight value associated with the one or more local features can be calculated 512. As discussed above, the confidence score can indicate a likelihood that the image includes a representation of one or more objects or subject that the CNN has been trained to identify. As such, the first weight value associated with the one or more local features may be inversely related to the confidence score. A second weight value associated with the object features may also be calculated 514 using the confidence score. The second weight value associated with the one or more object features may be directly related to the confidence score.

The object features and local features may be compared 516 against catalog data to identify visually similar items. For example, for each image in an electronic catalog of images, a first similarity score may be determined using the one or more local features. These first similarity scores indicate how similar the catalog image is to the query image, the similarity may be calculated based on the dot product of the local feature descriptors of the query image and the local feature descriptors of the catalog image. Additionally, a second similarity score for each image in the electronic catalog of images using the one or more object features. A combined similarity score can be determined 518 for each image in the electronic catalog of images by weighting the first similarity scores using the first weight value and weighting the second similarity scores using the second weight value.

A set of visually similar items can be provided 520 based at least on the combined similarity scores, the set of visually similar items being a subset of the electronic catalog of images. In some embodiments, the combined similarity score for each image in the electronic catalog of images can be compared to a threshold value, with each image from the electronic catalog of images having a similarity score greater than the threshold value being provided. In some embodiments, the images in the electronic catalog of images may be ranked according to the combined similarity scores and the top five, ten, or other predetermined number of images, may be provided.

In various embodiments, as described above, a set of images can be obtained, each image of the set of images including a representation of an artwork item, at least a portion of the set of images associated with metadata identifying at least one object represented in a respective image of the portion of the set of images. For each image of the portion of the first set of images, a respective object name can be associated with a corresponding image. A list of object labels may then be generated based at least in part on the object name identified in the respective metadata of each image of the set of images. In some embodiments, for each image of the portion of the set of training images, an object name can be associated from the list of object labels to generate a training set of images with associated object labels. The training set of images with associated object labels can be used to train a classifier to determine at least one object in a query image.

In some embodiments, a classifier can be trained to provide both a classification decision as well as a feature vector. In such a case, for a particular input image, the weight applied to the feature space generated by that classifier may vary depending on the confidence of the classifier on the classification decision for that input image.

As discussed above, in some embodiments, the confidence score can be used to determine whether to filter results and/or present one or more filter options to a user. If the confidence score indicates a high object affinity (e.g., a high likelihood that a particular object is depicted in the image) then the matching images can be filtered using the corresponding object. For example, as described above the confidence score may be normalized between 0 and 1. Such filers may be applied automatically or may be presented as selectable options to the user. For example, a selectable icon may be displayed which indicates that will cause a set of images to be filtered based on a corresponding object. In some embodiments, different threshold values may be associated with different filtering actions. For example, a very high confidence score (such as a score that is greater than 0.95) may cause the results to be automatically filtered, whereas a lower confidence score, such as 0.75 or 0.8, may cause the filter option to be displayed to the user.

In some embodiments, the weight values determined above based on the confidence score can be modified by a user. The adjusted weight values may then be used to provide a different subset of visually similar items corresponding to the user's weighting preferences.

Although embodiments of the present invention are described with respect to artwork items, images representing other items may also be used. For example, apparel items may be associated with patterns, colors, and cut/shape. For a given apparel item, a color classifier and a pattern classifier can be trained to produce classification confidences. If a confidence score associated with the pattern classifier is higher than a confidence score associated with the color classifier, then the pattern features can be more highly weighted and the weight applied to the color features can be reduced, resulting, for example, with related items that include color variations for the same or similar pattern. Likewise, if the confidence score associated with the color classifier is higher than that associated with the pattern classifier then the weights may be adjusted accordingly, resulting in, e.g., related items of the same color but potentially different patterns.

Figure 6:
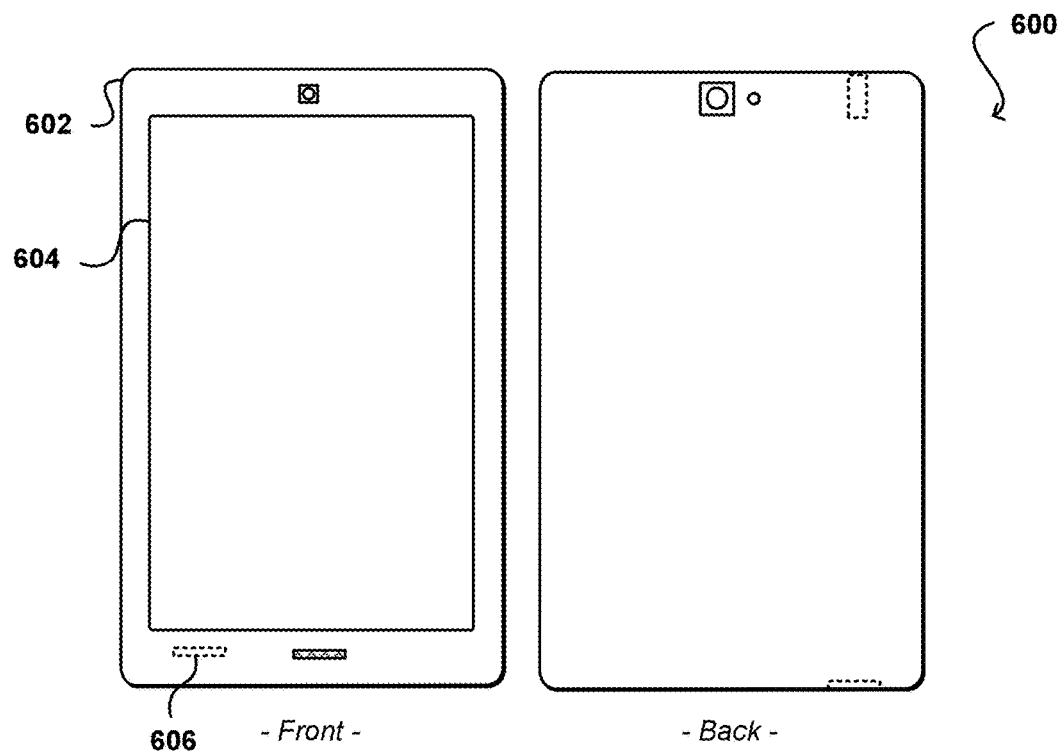
FIG. 6 illustrates an example device that can be used to implement aspects of the various embodiments.

FIG. 6 illustrates an example electronic user device 600 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 602 has a display screen 604 on the front side, which under normal operation will display information to a user facing the display screen (e.g., on the same side of the computing device as the display screen). It should be understood that computing devices such as servers, however, may not have dedicated display elements. The example computing device 600 also includes at least one networking component 606, such as a network interface card, wireless networking component, and the like, enabling the computing device to communicate information over at least one network.

Figure 7:
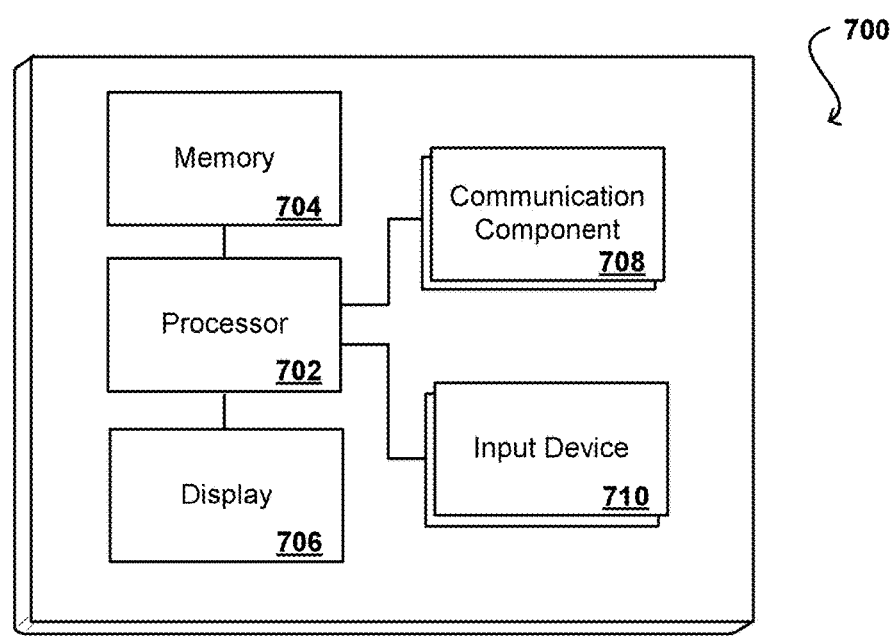
FIG. 7 illustrates example components of a client device such as that illustrated in FIG. 6.

FIG. 7 illustrates a logical arrangement of a set of general components of an example computing device 700 such as the device 600 described with respect to FIG. 6. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. In some embodiments, the computing device 700 of FIG. 7 can include one or more networking and/or communication elements 708, such as a Wi-Fi, Bluetooth, RF, wired, or wireless communication system. The device in many embodiments can communicate with a network, such as the Internet, and may be able to communicate with other such devices. In some embodiments the device can include at least one additional input component 710 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

Figure 8:
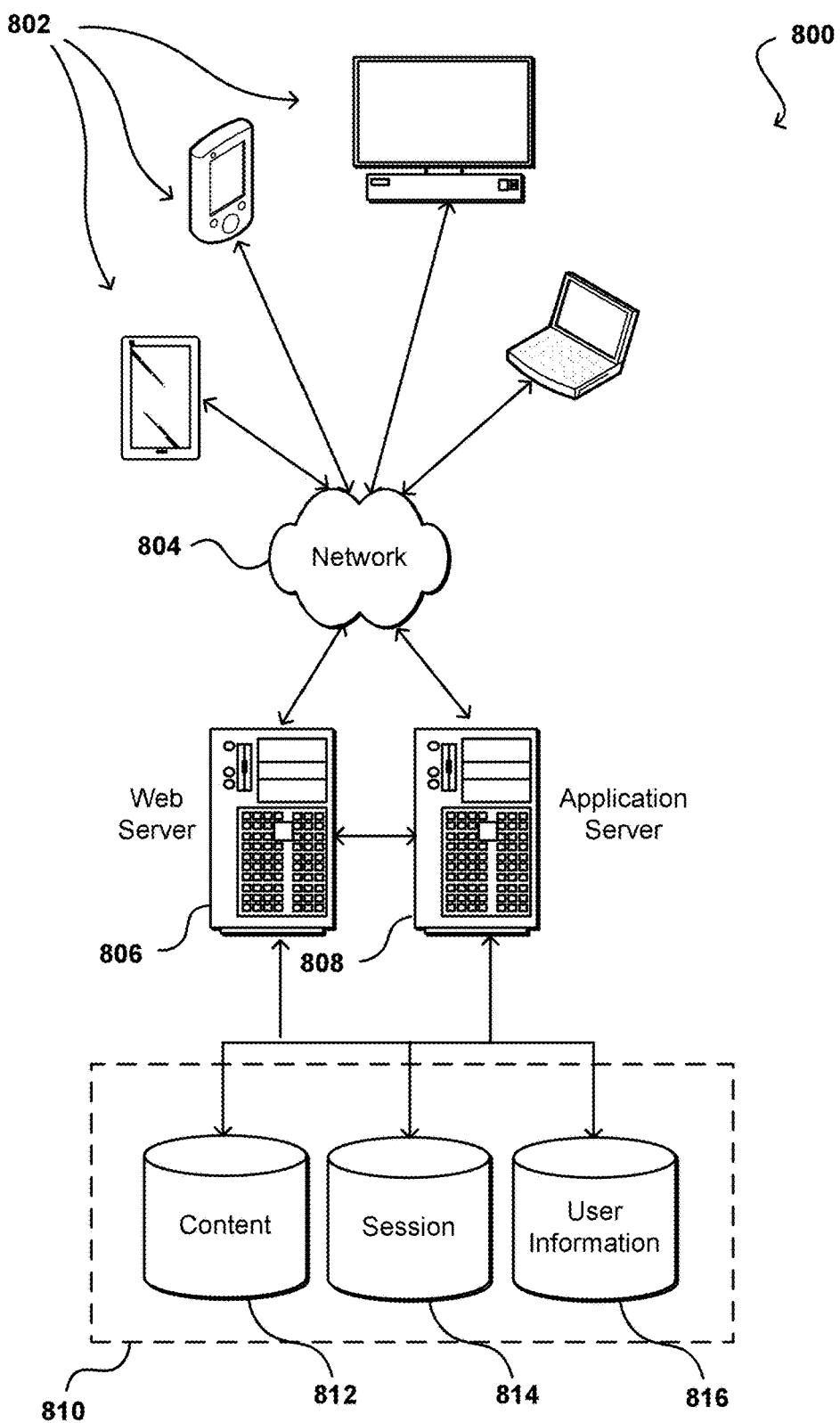
FIG. 8 illustrates an environment in which various embodiments can be implemented in accordance with various embodiments.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
   receiving a selection of a content item;

obtaining an image associated with the content item, the image including a representation of a subject;

analyzing the image to determine one or more local features of the image;

analyzing the image to determine one or more object features of the image;

determining a confidence score associated with the one or more object features;

calculating a first weight value associated with the one or more local features using the confidence score;

calculating a second weight value associated with the one or more object features using the confidence score;

determining first similarity scores for an electronic catalog of images using the one or more local features;

determining second similarity scores for the electronic catalog of images using the one or more object features;

determining combined similarity scores for the electronic catalog of images by weighting the first similarity scores using the first weight value and weighting the second similarity scores using the second weight value; and providing a set of visually similar items based at least on the combined similarity scores, the set of visually similar items being a subset of the electronic catalog of images.

2. The method of claim 1, further comprising:

obtaining a set of images, each image of the set of images including a representation of at least one object, at least a portion of the set of images associated with metadata identifying the at least one object represented in a respective image of the portion of the set of images;

associating, for each image of the portion of the first set of images, a respective object name with a corresponding image; and generating a list of object labels based at least in part on the object name identified in the respective metadata of each image of the set of images.

3. The method of claim 2, further comprising:

associating, for each image of the portion of the set of training images, an object name from the list of object labels to generate a training set of images with associated object labels; and training, using the training set of images with associated object labels, a classifier to determine at least one object in a query image.

4. The method of claim 1, wherein the content item is an artwork item and wherein the subject is one of abstract art, representational art, or figurative art.

5. A computing device, comprising:

a computing device processor;

a memory device including instructions that, when executed by the computing device processor, cause the computing device to:

obtain a query image that includes a representation of a subject;

analyze the image to determine a feature representation of the subject, the feature representation including one or more local features and one or more object features;

determine a confidence score associated with the feature representation;

determine weight values for the feature representation based at least on the confidence score;

compare the feature representation against an electronic catalog of feature representations to identify visually similar items; and determine, from the visually similar items, at least one item related to the subject.

6. The computing device of claim 5, wherein the confidence score indicates a likelihood that the representation of the subject includes one or more objects identifiable by a classifier.

7. The computing device of claim 5, wherein the instructions, when executed to compare the feature representation against an electronic catalog of feature representations to identify visually similar items further enable the computing device to:

determine first similarity scores for the electronic catalog of feature representations using the one or more local features;

determine second similarity scores for the electronic catalog of feature representations using the one or more object features; and determine combined similarity scores for the electronic catalog of feature representations using the weight values.

8. The computing device of claim 7, wherein the instructions, when executed to determine weight values for the feature representation based at least on the confidence score further enable the computing device to:

determine a first weight value associated with the one or more local features, the first weight value inversely related to the confidence score;

determine a second weight value associated with the one or more object features, the second weight value directly related to the confidence score; and determine the combined similarity scores by combining the first similarity scores weighted by the first weight value with the second similarity scores weighted by the second weight value.

9. The computing device of claim 7, wherein the instructions, when executed to determine, from the visually similar items, at least one item related to the subject further enable the computing device to:

compare the combined similarity scores to at least one threshold value; and select the at least one item related to the subject based at least on the comparison.

10. The computing device of claim 5, wherein the instructions, when executed further enable the computing device to:

determine the confidence score is greater than at least one threshold value;

display one or more filter options corresponding to the subject; and filter the one or more visually similar items based on the one or more filter options.

11. The computing device of claim 5, wherein the instructions, when executed further enable the computing device to:

obtain a set of images, each image of the set of images including a representation of at least one object, at least a portion of the set of images associated with metadata identifying the at least one object represented in a respective image of the portion of the set of images;

associate, for each image of the portion of the first set of images, a respective object name with a corresponding image; and generate a list of object labels based at least in part on the object name identified in the respective metadata of each image of the set of images.

12. The computing device of claim 5, wherein the instructions, when executed further enable the computing device to:
- associate, for each image of the portion of the set of training images, an object name from the list of object labels to generate a training set of images with associated object labels; and
- train, using the training set of images with associated object labels, a classifier to determine at least one object in a query image.

13. A method, comprising:
- obtaining a query image that includes a representation of a subject;
- analyzing the image to determine a feature representation of the subject, the feature representation including one or more local features and one or more object features;
- determining a confidence score associated with the feature representation;
- determining weight values for the feature representation based at least on the confidence score;
- comparing the feature representation against an electronic catalog of feature representations to identify visually similar items; and
- determining, from the visually similar items, at least one item related to the subject.

14. The method of claim 13, wherein the confidence score indicates a likelihood that the representation of the subject includes one or more objects identifiable by a classifier.

15. The method of claim 13, wherein comparing the feature representation against an electronic catalog of feature representations to identify visually similar items further comprises:
- determining first similarity scores for the electronic catalog of feature representations using the one or more local features;
- determining second similarity scores for the electronic catalog of feature representations using the one or more object features; and
- determining combined similarity scores for the electronic catalog of feature representations using the weight values.

16. The method of claim 15, wherein determining weight values for the feature representation based at least on the confidence score further comprises:
- determining a first weight value associated with the one or more local features, the first weight value inversely related to the confidence score;
- determining a second weight value associated with the one or more object features, the second weight value directly related to the confidence score; and
- determining the combined similarity scores by combining the first similarity scores weighted by the first weight value with the second similarity scores weighted by the second weight value.

17. The method of claim 16, wherein determining, from the visually similar items, at least one item related to the subject further comprises:
- comparing the combined similarity scores to at least one threshold value; and
- selecting the at least one item related to the subject based at least on the comparison.

18. The method of claim 13, further comprising:
- determining the confidence score is greater than at least one threshold value;
- displaying one or more filter options corresponding to the subject; and
- filtering the one or more visually similar items based on the one or more filter options.

19. The method of claim 13, further comprising:
- obtaining a set of images, each image of the set of images including a representation of at least one object, at least a portion of the set of images associated with metadata identifying the at least one object represented in a respective image of the portion of the set of images;
- associating, for each image of the portion of the first set of images, a respective object name with a corresponding image; and
- generating a list of object labels based at least in part on the object name identified in the respective metadata of each image of the set of images.

20. The method of claim 13, further comprising:
- associating, for each image of the portion of the set of training images, an object name from the list of object labels to generate a training set of images with associated object labels; and
- training, using the training set of images with associated object labels, a classifier to determine at least one object in a query image.

* * * * *